US012795553B2

(12) United States Patent
Li et al.

(10) Patent No.: US 12,795,553 B2
(45) Date of Patent: Nov. 10, 2026

(54) SINR MEASUREMENT TECHNIQUES FOR POWER SAVING

(71) Applicant: Intel Products IP LLC, Santa Clara, CA (US)

(72) Inventors: Hua Li, Arlington, VA (US); Meng Zhang, Beijing (CN); Andrey Chervyakov, Nizhny Novgorod (RU); Rui Huang, Beijing (CN); Ilya Bolotin, Nizhny-Novgorod (RU)

(73) Assignee: Intel Products IP LLC, Santa Clara, CA (US)

( * ) Notice: Subject to any disclaimer, the term of this patent is extended or adjusted under 35 U.S.C. 154(b) by 220 days.

(21) Appl. No.: 18/279,226

(22) PCT Filed: Mar. 22, 2022

(86) PCT No.: PCT/US2022/021292
§ 371 (c)(1),
(2) Date: Aug. 29, 2023

(87) PCT Pub. No.: WO2022/204104
PCT Pub. Date: Sep. 29, 2022

(65) Prior Publication Data

US 2024/0155504 A1 May 9, 2024

Related U.S. Application Data

(60) Provisional application No. 63/166,815, filed on Mar. 26, 2021, provisional application No. 63/166,821, filed on Mar. 26, 2021.

(51) Int. Cl.
*H04W 52/24* (2009.01)
*H04B 17/336* (2015.01)

(52) U.S. Cl.
CPC ........ *H04W 52/241* (2013.01); *H04B 17/336* (2015.01)

(58) Field of Classification Search
CPC ............... H04W 52/241; H04W 24/02; H04W 52/0216; H04W 52/0229; H04W 52/028;
(Continued)

(56) References Cited

U.S. PATENT DOCUMENTS

2018/0035345 A1 2/2018 Chockalingam et al.
2022/0104044 A1 * 3/2022 Huang .................. H04W 24/08
(Continued)

FOREIGN PATENT DOCUMENTS

JP 2007124048 A 5/2007
KR 20210022640 A 3/2021
(Continued)

OTHER PUBLICATIONS

Mediatek, Inc, "Evaluation on Rel-17 RLMBFD measurement relaxation", BGPP DRAFT; R4-2014367, 3rd Generation Partnership Project (BGPP), Mobile Competence Centre ; 650, Route Des Lucioles ; F-06921 Sophia-Antipolis Cedex ;France, Ran Wg4, Electronic Meeting, [Online]. Retrieved from the Internet: URL:https: ftp.3gpp.org tsg_ran WG4_Radio TSGR4_97_e Docs R42014367. 2ipR42014367Evaluation on Rel-17RLMBFD measurement relaxation_ final.docx, (Oct. 23, 2020), 11 pgs.
(Continued)

*Primary Examiner* — Marcos L Torres
(74) *Attorney, Agent, or Firm* — Schwegman Lundberg & Woessner, P.A.

(57) ABSTRACT

An apparatus and system for power saving in a user equipment (UE) are described. The UE uses signal-to-interference-plus-noise (SINR) of radio link monitoring (REM) signals to determine whether to enter or exit a relaxation state in which the frequency of measurement of the REM
(Continued)

signals is reduced, as is feedback to the base station. The REM relaxation state is dependent on the average SINR of the REM signals over a predetermined time window. Alternatively, the REM relaxation state is dependent on SINR thresholds that include an SINR fluctuation range using a SINR threshold for REM in-sync or derived from a Cumulative Distribution Function (CDF) curve of SINR using a predetermined maximum SINR fluctuation.

18 Claims, 7 Drawing Sheets

(58) Field of Classification Search
CPC .. H04W 24/08; H04W 52/0261; Y02D 30/70; H04B 17/336; H04L 5/005
See application file for complete search history.

(56) References Cited

U.S. PATENT DOCUMENTS

| | | | | |
|---|---|---|---|---|
| 2022/0394535 | A1* | 12/2022 | Li | H04W 24/10 |
| 2022/0417781 | A1* | 12/2022 | Xie | H04W 72/02 |
| 2023/0397282 | A1* | 12/2023 | Thangarasa | H04W 76/19 |

FOREIGN PATENT DOCUMENTS

| | | | |
|---|---|---|---|
| WO | WO-2019214721 | A1 | 11/2019 |
| WO | WO-2020166029 | A1 | 8/2020 |
| WO | WO-2022204104 | A1 | 9/2022 |
| WO | 2022204104 | | 8/2023 |

OTHER PUBLICATIONS

MEDIATEK, INC., "Evaluation on Rel-17 RLMBFD measurement relaxation", 3GPP DRAFT; R4-2101222, 3rd Generation Partnership Project (3GPP), Mobile Competence Centre ; 650, Route Des Lucioles ; F-06921 Sophia-Antipolis Cedex ; France, Ran Wg4, Electronic Meeting, [Online]. Retrieved from the Internet: URL:https: ftp.39pp.orgtsg_ran WG4_Radio TSGR4_98_e Docs R42101222. zipR42101222Evaluation on Rel-17 RLMBFD measurementrelaxation_final.DOCX, (Jan. 15, 2021), 13 pgs
Qualcomm, Incorporated, "Discussion on RLMBFD Relaxation", 3GPP Draft; R4-2102587, 3rd Generation Partnership Project (BGPP), Mobile Competence Centre ; 650, Route Des Lucioles ; F-06921 Sophia-Antipolis Cedex ; France, Ran W94, (Jan. 15, 2021), 3 pgs
"3GPP; TSG RAN; NR; User Equipment (UE) conformance specification; Radio Resource Management (RRM) (Release 16)", 3GPP TS 38.533 V16.6.0, (Dec. 29, 2020).
"Discussion on RLM/BFD relaxation factor", CATT, R4-2100474, 3GPP TSG-RAN WG4 Meeting #98-e, Electronic Meeting, (Jan. 15, 2021).
"Evaluation on Rel-17 RLM/BFD measurement relaxation", Mediatek Inc. R4-2101222, 3GPP TSGRAN WG4 Meeting #98-e, Electronic Meeting, (Jan. 15, 2021).
"International Application Serial No. PCT/US2022/021292, International Search Report mailed Jul. 6, 2022", 3 pgs.
"International Application Serial No. PCT/US2022/021292, Written Opinion mailed Jul. 6, 2022", 5 pgs.
"Japanese Application Serial No. 2023-558373, Office Action mailed Jan. 13, 2026", w/t English Translation, 17 pgs.
"International Application Serial No. PCT US2022 021292, International Preliminary Report on Patentability mailed Oct. 5, 2023", 7 pgs.
"European Application Serial No. 22776439.6, Extended European Search Report mailed Jan. 14, 2025", 12 pgs.
CMCC, "Discussion on RLMBFD relaxation for NR power saving enhancement", 3GPP Draft; R4-2100821,3rd Generation Partnership Project (3GPP), Mobile Competence Centre; 650, Route Des Lucioles; F-06921 Sophia-Antipolis Cedex ; France, Ran WG4, No. Electronic Meeting, (Jan. 15, 2021), 11 pgs.
Mediatek, Inc, "Evaluation on Rel-17 RLMBFD measurement relaxation", 3GPP Draft; R4-2014367, 3rd Generation Partnership Project (3GPP), Mobile Competence Centre; 650, Route Des Lucioles; F-06921 Sophia-Antipolis Cedex ; France, Ran Wg4, Electronic Meeting, [Online]. Retrieved from the Internet: URL:https: ftp.3gpp.org tsg_ran WG4_Radio TSGR4_97_e Docs R42014367. zipR42014367Evaluation on Rel-17RLMBFD measurement relaxation_final.docx, (Oct. 23, 2020), 11 pgs.
Mediatek, Inc, "Evaluation on Rel-17 RLMBFD measurement relaxation", 3GPP Draft; R4-2101222, 3rd Generation Partnership Project (3GPP), Mobile Competence Centre; 650, Route Des Lucioles; F-06921 Sophia-Antipolis Cedex; France, Ran Wg4, Electronic Meeting, [Online]. Retrieved from the Internet: URL:https: ftp.3gpp.org tsg_ran WG4_Radio TSGR4_98_e Docs R42101222. zipR42101222Evaluation on Rel-17 RLMBFD measurementrelaxation_final.DOCX, (Jan. 15, 2021), 13 pgs.
Qualcomm, Incorporated, "Discussion on RLMBFD Relaxation", 3GPP Draft; R4-2102587, 3rd Generation Partnership Project (3GPP), Mobile Competence Centre; 650, Route Des Lucioles; F-06921 Sophia-Antipolis Cedex; France, Ran Wg4, (Jan. 15, 2021), 3 pgs.

* cited by examiner

SINR MEASUREMENT TECHNIQUES FOR POWER SAVING

PRIORITY CLAIM

This application is a U.S. National Stage Filing under 35 U.S.C. 371 from International Application No. PCT/US2022/021292, filed Mar. 22, 2022 and published in English as WO 2022/204104 on Sep. 29, 2022, which claims the benefit of priority to U.S. Provisional Patent Application Ser. No. 63/166,815, filed Mar. 26, 2021, and U.S. Provisional Patent Application Ser. No. 63/166,821, filed Mar. 26, 2021, each which is incorporated herein by reference in its entirety.

TECHNICAL FIELD

Embodiments pertain to new radio (NR) wireless communications. Some embodiments relate to Radio Link Monitoring (RLM) in NR wireless communication networks. In particular, some embodiments relate to UE power saving based on RLM.

BACKGROUND

The use and complexity of NR wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
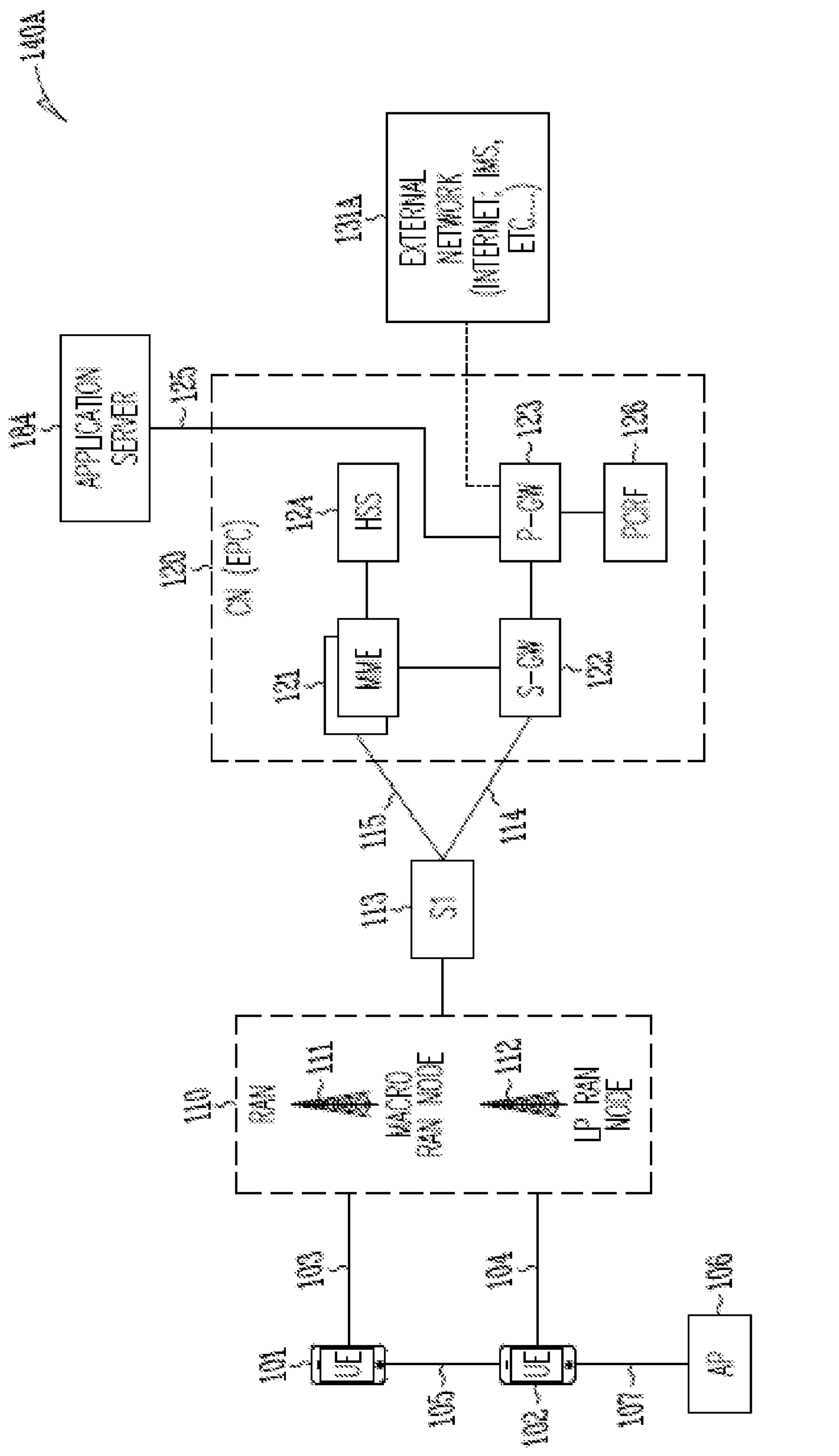
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation ($5^{th}$ or $6^{th}$ generation) NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
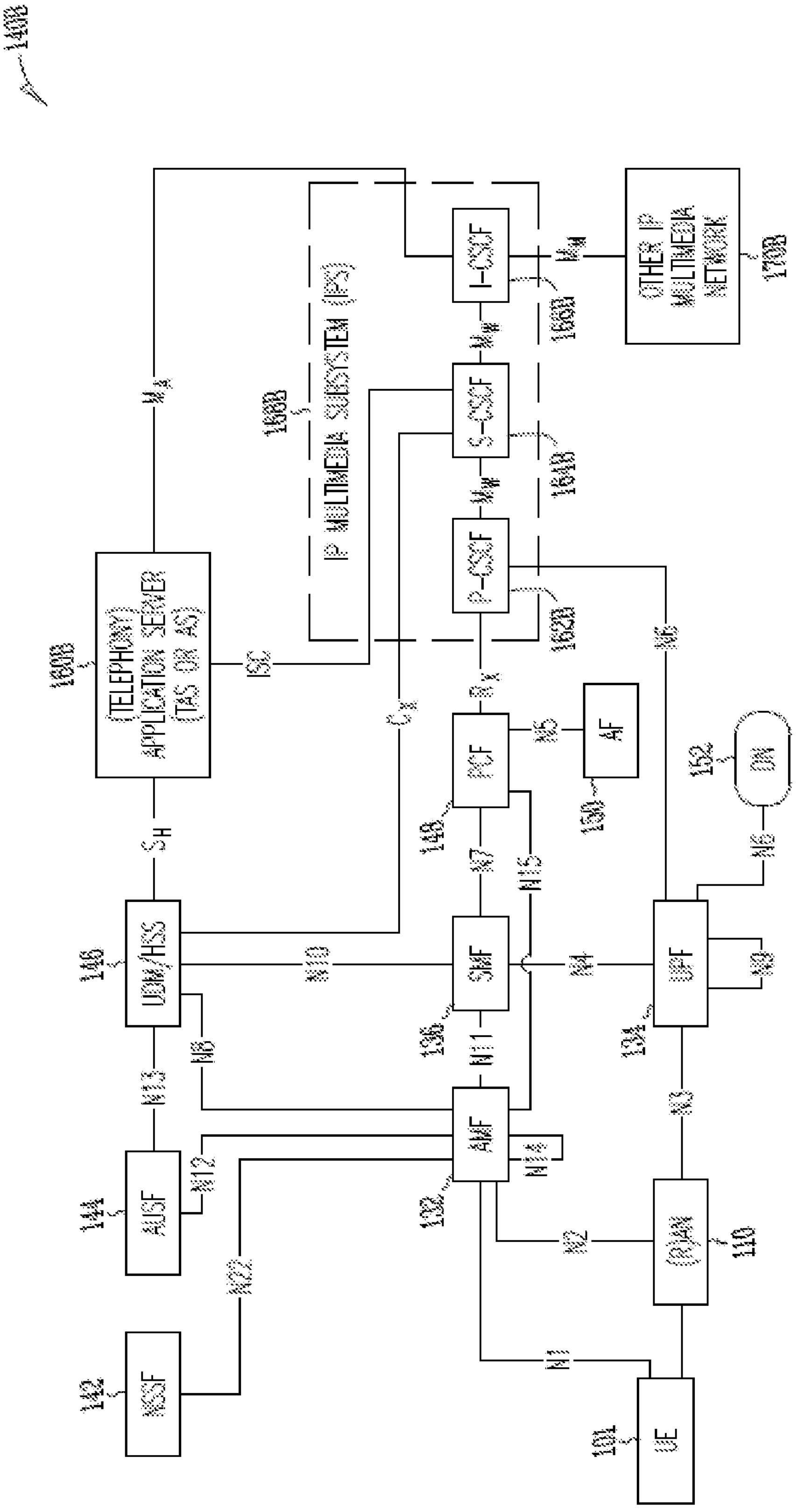
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
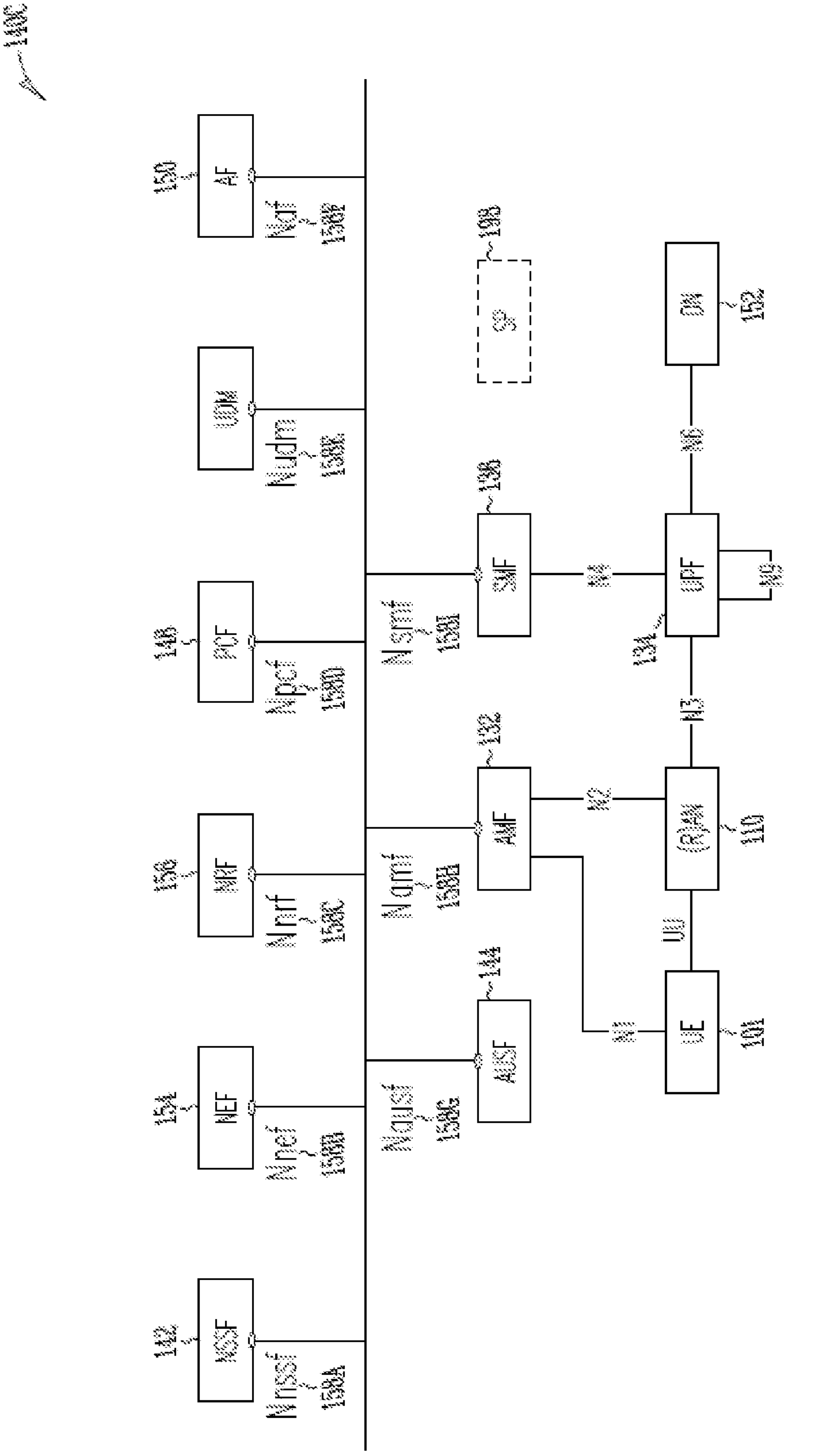
FIG. 1C illustrates a non-roaming 5G system architecture in accordance with some aspects.

FIG. 1C illustrates a 5G system architecture 140C and a service-based representation. In addition to the network entities illustrated in FIG. 1, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
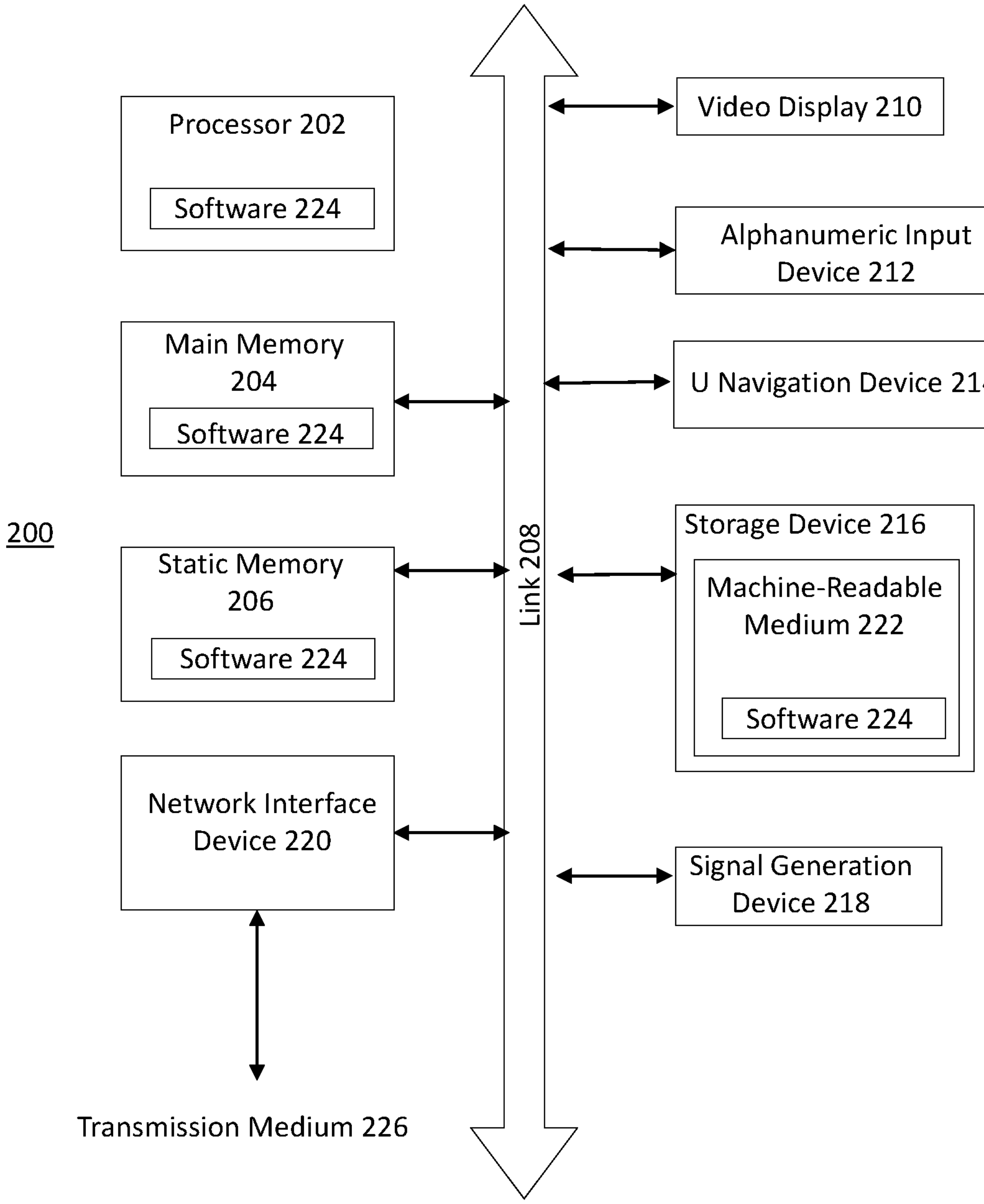
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, one of the issues is improvement in cell reselection. Power saving may be designed for idle mode cell reselection, where Reference Signal Received Power (RSRP) is used as the measurement reference. A UE in idle mode has no radio resource control (RRC) connection with the gNB and can move to an RRC connected mode using an initial attach procedure or a connection establishment procedure.

Once the RRC connection is established, the UE performs radio link monitoring (RLM), continuously measuring reference signals from the serving gNB (or cell) to determine the radio link quality and providing feedback to the serving gNB. The 5G reference signals measured include signaling system block (SSB) signals or Channel State Information Reference Signals (CSI-RS). These measurements can be used to determine radio link failure (RLF) has occurred and to trigger an RRC reestablishment procedure.

Continuous measurement and feedback, however, may use a significant amount of power by the UE. Accordingly, UE power saving may be facilitated by relaxation of the RLM measurements, in which the UE is permitted to reduce the frequency of performing RLM measurements (and provide feedback to the gNB) when certain criteria are met (i.e., the UE is in a relaxation state). In particular, under normal RLM procedures, the UE measures the SINR of the measured 5G reference signals. The UE then compares the SINR to a threshold Qin (the level at which the downlink radio link can be reliably received) and threshold Qout (the level at which the downlink radio link cannot be reliably received) to tell whether the serving cell quality is good enough to maintain data traffic. Since RLM depends on the SINR estimation, the relaxation criteria may consider the SINR. An absolute SINR value can be used as the metric for the serving cell quality not only for RLM but also for the criteria to relax RLM measurements.

Figure 3:
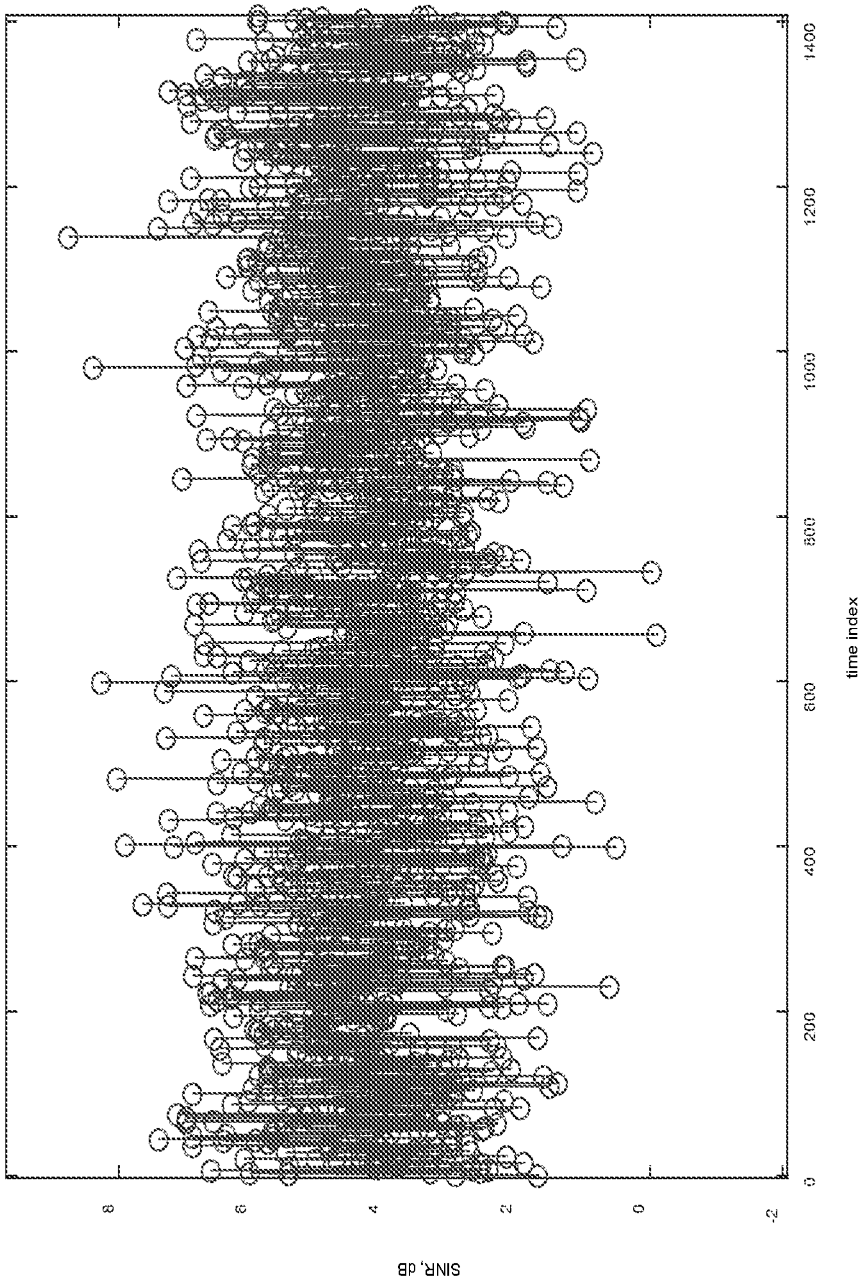
FIG. 3 illustrates a plot of simulated signal-to-interference-plus-noise (SINR) vs time in accordance with some aspects.

In addition, SINR level changes more quickly than the RSRP. FIG. 3 illustrates a plot of simulated SINR vs time in accordance with some aspects. As shown in FIG. 3, the estimated SINR value varies with time, and only reflects the instant channel quality. If a fixed SINR value is used as the threshold for relaxation, the estimated SNR value may frequently cross the threshold. For example, if the averaged SINR=4 dB for current channel, due to fluctuation, the SINR range may vary due to a number of conditions instantaneously from OdB to 8 dB.

If the instant SINR is larger than the threshold SINR, the UE may determine that relaxation is appropriate (i.e., enter the relaxation state). However, whether to initiate relaxation when the determined SINR is below the threshold while still higher than the Out of Service (OOS) threshold remains a question, in particular to determine whether the relaxion scheme is stable (and thus whether to exit the relaxation state).

Accordingly, to provide more robust relaxion scheme and reduce fluctuation of the SINR, in some embodiments, the SINR is measured and processed during a time window to determine whether the relaxation criteria is satisfied and thus whether entry to or exit from the relaxation state is appropriate (also referred to respectively as relaxation state on and relaxation state off). In some embodiments, the evaluation period of the SINR and the manner of processing the SINR value during the period for relaxed RLM are described.

Figure 4:
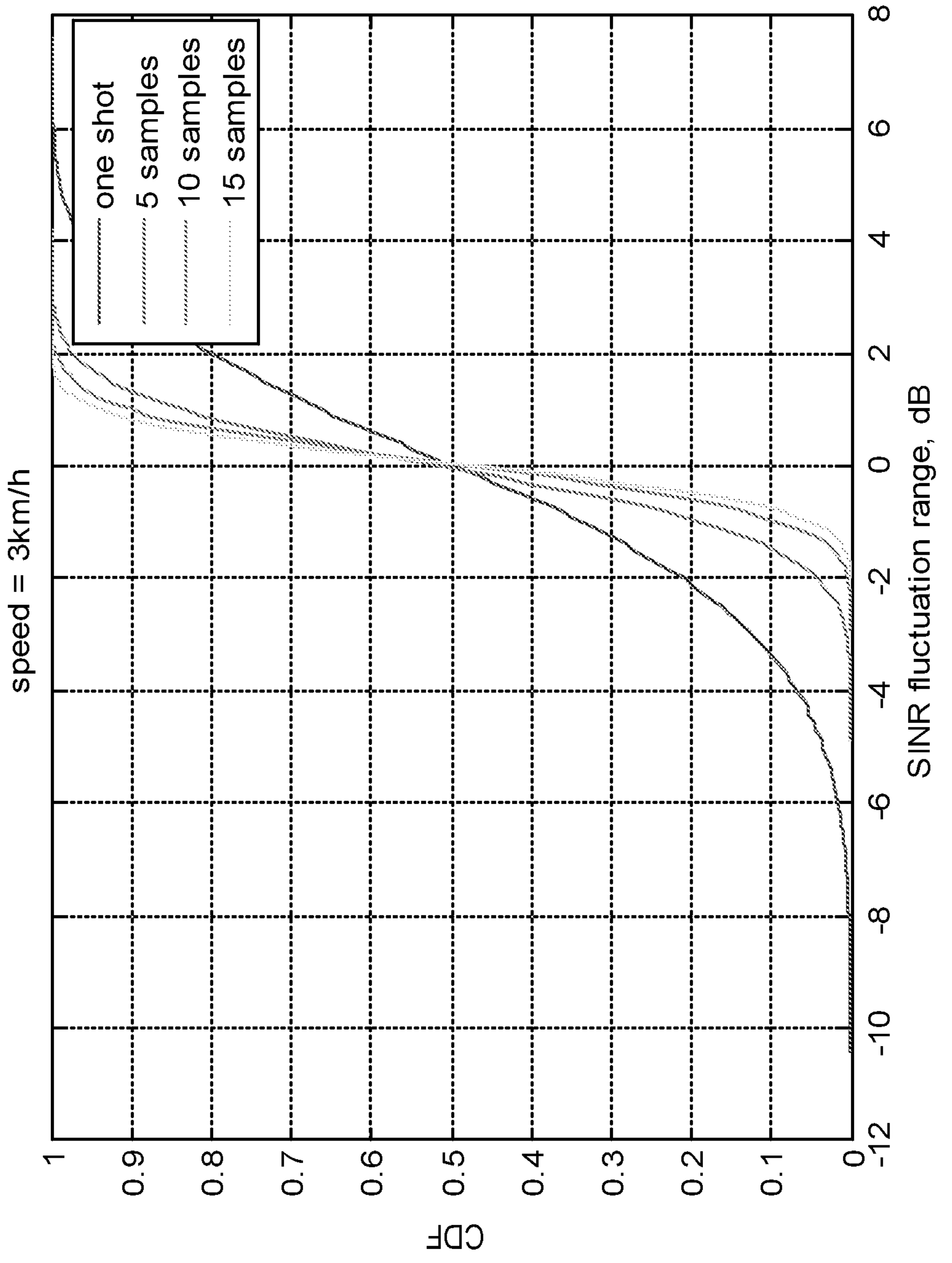
FIG. 4 illustrates a plot of Cumulative Distribution Function (CDF) vs SINR fluctuation in accordance with some aspects.

The impact of measurement period on reducing SINR fluctuation is described herein. Different evaluation times are simulated for low speed cases. FIG. 4 illustrates a plot of CDF vs SINR fluctuation in accordance with some aspects. The UE speed in FIG. 4 was simulated as 3 km/h. The SINR estimation error by the UE was not considered. The evaluation time was a predetermined number of samples: 1, 5, 10, or 15 samples. The CSI-RS periodicity was 5 ms. The window length was thus 1/5/10/15*5 ms. The X axis in FIG. 4 is the SINR fluctuation range. During the evaluation time, the instantaneous SINR values were averaged to get a single filtered SINR value.

The simulation results in FIG. 4 show that SINR fluctuation will be reduced with more averaged samples. As can be seen from the CDF in FIG. 4, for 10 samples as an evaluation time, the maximum SINR fluctuation range is smaller than 1.3 dB for 95% of the cases. However, if only one sample is used, the maximum SINR fluctuation range increases to 4.5 dB for 95% of the cases. Thus, the SINR measurement window to reduce SINR fluctuation for RLM relaxation may be set as $N*T_{CSI\text{-}RS/SSB}$, where N is the number of SSB/CSI-RS samples and $T_{CSI\text{-}RS/SSB}$ is the periodicity of the SSB/CSI-RS transmissions from the gNB. The window duration may depend on the UE speed, decreasing as the speed increases and increasing as the speed decreases.

The SINR processing method during the window is also discussed below; both the method of obtaining the SINR value and of processing the SINR in the window are described. The instant SINR value may first be obtained, and these instant SINR values may next be filtered.

In a first embodiment, the instant SINR value can be derived from the SSB/CSI-RS measurement (i.e., directly from the RLM signals themselves). In a second embodiment, the instant SINR value can be derived from the Block Error Rate (BLER)-SINR mapping table that is provided by the UE by the gNB or preloaded into the UE. In the second embodiment, the UE first calculates the BLER, then transforms the value of the BLER to the SINR based on the mapping table.

After the UE has determined several instant SINR values, the SINR values may be processed during a measurement window. To process the SINR values, in a first method the SINR is averaged over N instantaneous SINR values, where N is sample number in the window. In a second embodiment, the signal level and noise level are respectively averaged over N samples. The averaged signal power is then divided by the averaged noise power to obtain the averaged SINR. The averaged SINR obtained by either embodiment can be used for RLM/beam failure detection (BFD) relaxation evaluation.

The low mobility of Rel-16 reflects the low fluctuation of the filtered RSRP. For Rel-17, since the RLM/BFD depends on the SINR estimation, the low mobility criteria used in Rel-16 is not suitable for reuse. The RSRP mainly focuses on the useful signal power, while the SINR also takes the noise and interference power into account. For Rel-17, a “low fluctuation of SINR” may be considered, which is more directly relevant to RLM/BFD performance. RLM/BFD relaxation scheme may be used in low SINR fluctuation scenarios.

In some embodiments, in a first operation of the measurement method to reflect low SINR fluctuation the UE calculates the ΔSINR between adjacent SINR levels (the SINR determined between adjacent sets of measurements). In a second operation, the ΔSINR is compared with a threshold. If 1 is smaller than the threshold for a time duration, it can be assumed that current scenario is stable and in “low fluctuation of SINR” state.

In some embodiments of relaxation criteria for RLM, the SINR calculated by the UE may be compared against a fixed SINR threshold to determine whether the relaxation criteria are satisfied. For example, the fixed threshold can be $X=Q_{out}+Z$ dB, where $Q_{out}$ is the SINR threshold for RLM/BFD OOS and Z dB is extra margin to ensure that channel is in good condition.

Since the SINR will fluctuate over time, the SINR fluctuation range can be further added to the fixed SINR threshold to make sure that in most cases, the SINR is still above the threshold in 95%. For example, if the SINR threshold is X dB and SINR fluctuation range is Y dB, the final SINR threshold will be X+Y dB. The SINR fluctuation range can be derived from the CDF curve of the SINR, where max(5%, 95%) of the SINR fluctuation is chosen as the Y dB. In other embodiments, the threshold may be other than 95%.

BFD is designed to help the UE determine poor beam quality and trigger beam failure recovery without causing radio link failure. If SINR is used as the relaxation criteria, similar to RLM, the SINR fluctuation range can be further added to the SINR threshold. Since $Q_{out}$ of BFD is 4 dB higher than $Q_{out}$ of RLM, if the same margin is considered for relaxation criteria, the criteria for BFD is more strict. That is, the SINR relaxation threshold for BFD is higher than that of RLM.

On the other hand, the criteria for in-sync in beam management satisfied that the measured layer 1 (L1)-RSRP is equal to or better than the threshold $Qin\_L_R$, which is indicated by higher layer parameter rsrp-ThresholdSSB. In-sync of BM is different from RLM, where RSRP will also be considered. Therefore, RSRP may also be considered as relaxation criteria for BFD. For example, the UE can relax the BFD measurement when the measured RSRP is higher than the RSRP threshold.

In some embodiments, the criteria to enter relaxation criteria and revert to the normal RLM operation should be aligned. In some embodiments, the UE performs relaxed RLM; upon detecting a predetermined number of out-of-sync indications, upon triggering timer 310 (T310), or upon an observed link quality degradation or mobility state change the UE may revert to the normal RLM operation (i.e., without relaxation). T310 is triggered by detection of physical layer problems for the serving cell and upon expiry causes the UE to enter the RRC_Idle state or initiates a connection re-establishment procedure. Accordingly, in various embodiments, the UE may revert to the normal RLM operation when the relaxation criterion is not met, when N310 starts to count (i.e., 1 out-of-sync indication is received), when T310 is running (i.e., N310 out-of-sync indications are received), when link quality degradation is observed, or when mobility state change is observed.

Figure 5:
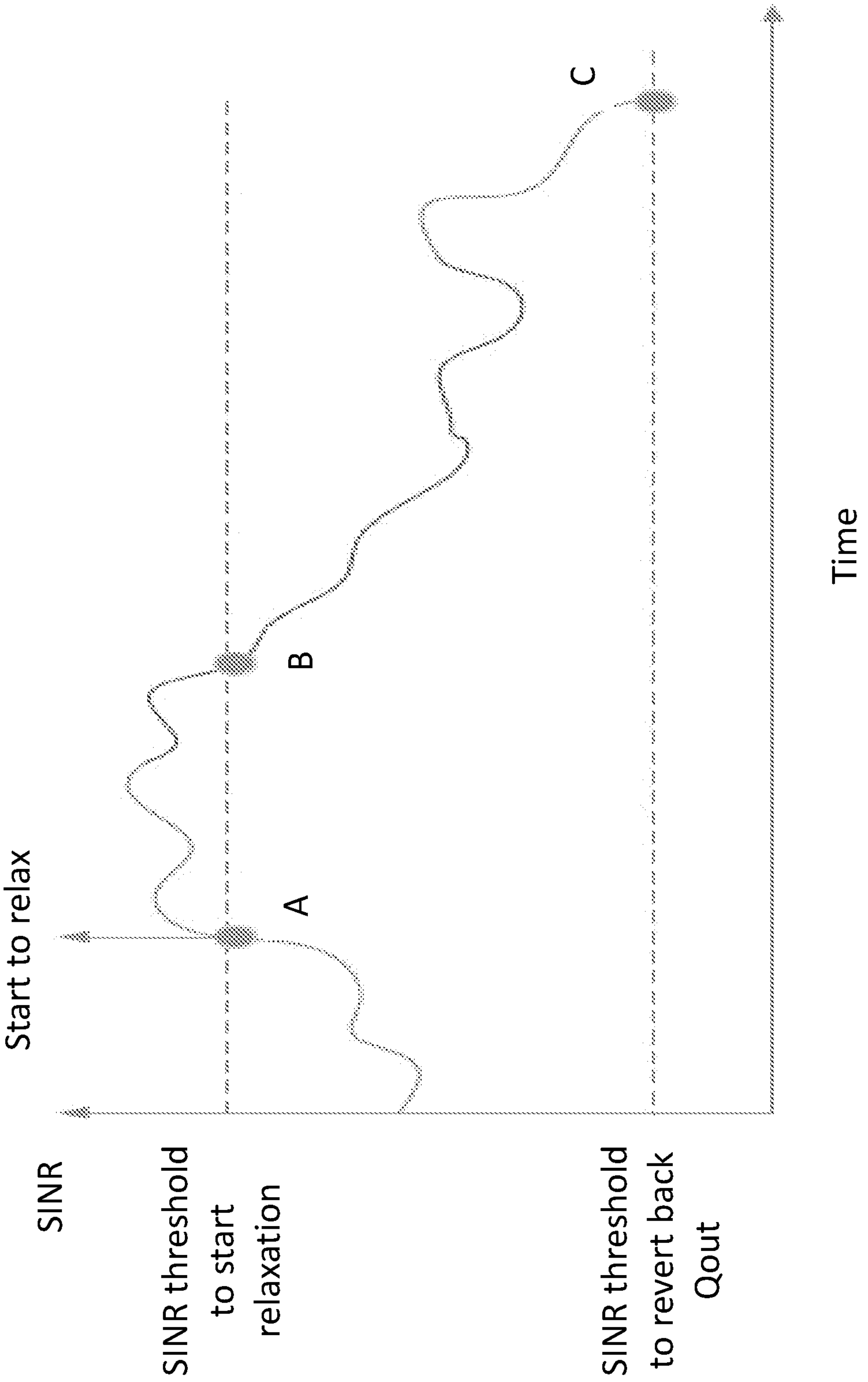
FIG. 5 illustrates a plot of SINR vs time with relaxation in accordance with some aspects.

If high SINR is considered as the criteria to enter the relaxation criteria and out-of-sync as the exit criteria, the SINR gap may be relatively large, potentially leading to issues. FIG. 5 illustrates a plot of SINR vs time with relaxation in accordance with some aspects.

The problem is illustrated in FIG. 5: at time A, the SINR is higher than the SINR criteria to start relaxation, RLM starts to relax. Starting from point B, the SINR is below the relaxation threshold while still higher than the OOS threshold and the UE will not revert back to normal mode. However, the relaxation criteria are not satisfied from time B to C. Relaxation criteria and reverting criteria may thus be designed jointly to avoid such cases. Suppose the fixed SINR threshold is X dB and the SINR fluctuation range is Y dB, the final SINR threshold may be X+YdB and the reversion threshold may be set to then be X-Y dB. In some embodiments, the final SINR threshold may be X+YdB but the reversion threshold may be set to be X-Z dB. Alternatively, or in addition, the reversion threshold can be Qin, where Qin is the SINR threshold for RLM in-sync, or the final SINR threshold may be Qout. In various embodiments, Y may be, for example, 2 dB, 4 dB, etc. . . .

As for reverting back to BFD, since the RSRP may also be considered as the relaxation criteria, the reversion criteria may also consider RSRP. The thresholds for BFD and for RLM may be set independently. Both thresholds may be based on the SINR information, as above.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A user equipment (UE) comprising: memory; and processing circuitry to configure the UE to:

apply a mobility criterion and a serving cell criterion configured for radio link monitoring (RLM) relaxation and beam failure detection (BFD) relaxation, the mobility criterion fulfilled for a signal measurement of a serving cell changing less than a first margin over a first time period, the serving cell criterion applied separately for a determination whether RLM relaxation is permitted than for a determination whether BFD relaxation is permitted, the serving cell criterion for RLM relaxation fulfilled when a downlink radio link quality on a configured RLM reference signal resource is better than a first threshold, the first threshold including a first offset parameter applied to one of an in-sync and out-of-sync quality threshold, criterion for BFD relaxation fulfilled when downlink radio link quality on a configured BFD reference signal resource is better than a second threshold, the second threshold including a second offset parameter applied to the one of the in-sync and out-of-sync quality threshold, the first offset parameter being configurable separately from the second offset parameter;

in response to the mobility criterion and the serving cell criterion being satisfied, measure RLM signals from a serving cell using relaxed measurement criteria;

compare a quality of the RLM signals with a predetermined RLM relaxation threshold; and based on a comparison between the quality of the RLM signals and the predetermined RLM relaxation threshold, no longer use the relaxed measurement criteria to measure the RLM signals.

2. The UE of claim 1, wherein the RLM signals comprise at least one of signaling system block (SSB) signals or Channel State Information Reference Signals (CSI-RS).

3. The UE of claim 2, wherein the processing circuitry is configured to determine whether to continue to use the relaxed measurement criteria based on an evaluation of whether downlink radio link quality on a configured RLM-reference signal (RS) resource estimated over a predetermined evaluation period becomes worse than the predetermined RLM relaxation threshold within the predetermined evaluation period.

4. The UE of claim 3, wherein the processing circuitry is configured to evaluate whether downlink radio link quality on a configured SSB resource estimated over a second predetermined evaluation period becomes worse than a second predetermined threshold within the second predetermined evaluation period.

5. The UE of claim 2, wherein the processing circuitry is configured to evaluate whether downlink radio link quality on a configured SSB resource estimated over a predetermined evaluation period becomes worse than the predetermined RLM relaxation threshold within the predetermined evaluation period.

6. The UE of claim 1, wherein the processing circuitry is configured to determine whether to continue to use the relaxed measurement criteria based on whether out-of sync indications are to be sent.

7. The UE of claim 1, wherein the processing circuitry is configured to determine radio link quality based on a Block Error Rate (BLER) of the RLM signals.

8. The UE of claim 1, wherein the processing circuitry is configured to determine whether to continue to use the relaxed measurement criteria based on whether a T310 timer is running.

9. A non-transitory computer-readable storage medium that stores instructions for execution by one or more processors of a user equipment (UE), the one or more processors configured to, when the instructions are executed:

apply a mobility criterion and a serving cell criterion configured for radio link monitoring (RLM) relaxation and beam failure detection (BFD) relaxation, the mobility criterion fulfilled for a signal measurement of a serving cell changing less than a first margin over a first time period, the serving cell criterion applied separately for a determination whether RLM relaxation is permitted than for a determination whether BFD relaxation is permitted, the serving cell criterion for RLM relaxation fulfilled when a downlink radio link quality on a configured RLM reference signal resource is better than a first threshold, the first threshold including a first offset parameter applied to one of an in-sync and out-of-sync quality threshold, criterion for BFD relaxation fulfilled when downlink radio link quality on a configured BFD reference signal resource is better than a second threshold, the second threshold including a second offset parameter applied to the one of the in-sync and out-of-sync quality threshold, the first offset parameter being configurable separately from the second offset parameter;

in response to the mobility criterion and the serving cell criterion being satisfied, measure RLM signals from a serving cell using relaxed measurement criteria;

compare a quality of the RLM signals with a predetermined RLM relaxation threshold; and based on a comparison between the quality of the RLM signals and the predetermined RLM relaxation threshold, no longer use the relaxed measurement criteria to measure the RLM signals.

10. The non-transitory computer-readable storage medium of claim 9, wherein the RLM signals comprise at least one of signaling system block (SSB) signals or Channel State Information Reference Signals (CSI-RS).

11. The non-transitory computer-readable storage medium of claim 10, wherein the one or more processors are configured to, when the instructions are executed, determine whether to continue to use the relaxed measurement criteria based on an evaluation of whether downlink radio link quality on a configured RLM-reference signal (RS) resource estimated over a predetermined evaluation period becomes worse than the predetermined RLM relaxation threshold within the predetermined evaluation period.

12. The non-transitory computer-readable storage medium of claim 11, wherein the one or more processors are configured to, when the instructions are executed, evaluate whether downlink radio link quality on a configured SSB resource estimated over a second predetermined evaluation period becomes worse than a second predetermined threshold within the second predetermined evaluation period.

13. The non-transitory computer-readable storage medium of claim 9, wherein the one or more processors are configured to, when the instructions are executed, determine whether to continue to use the relaxed measurement criteria based on whether out-of sync indications are to be sent.

14. The non-transitory computer-readable storage medium of claim 9, wherein the one or more processors are configured to, when the instructions are executed, determine radio link quality based on a Block Error Rate (BLER) of the RLM signals.

15. The non-transitory computer-readable storage medium of claim 9, wherein the one or more processors are configured to, when the instructions are executed, determine whether to continue to use the relaxed measurement criteria based on whether a T310 timer is running.

16. The non-transitory computer-readable storage medium of claim 9, wherein the one or more processors are configured to, when the instructions are executed:

evaluate whether downlink radio link quality meets relaxed measurement criteria for at least one of relaxed radio link monitoring or relaxed beam failure detection; and in response to a determination that the downlink radio link quality meets the relaxed measurement criteria for at least one of relaxed radio link monitoring or relaxed beam failure detection, employ the at least one of relaxed radio link monitoring or relaxed beam failure detection.

17. A communication system comprising:

an antenna configured to receive radio link monitoring (RLM) signals from a serving cell; and processing circuitry configured to:

apply a mobility criterion and a serving cell criterion configured for radio link measurement (RLM) relaxation and beam failure detection (BFD) relaxation, the mobility criterion fulfilled for a signal measurement of a serving cell changing less than a first margin over a first time period, the serving cell criterion applied separately for a determination whether RLM relaxation is permitted than for a determination whether BFD relaxation is permitted, the serving cell criterion for RLM relaxation fulfilled when a downlink radio link quality on a configured RLM reference signal resource is better than a first threshold, the first threshold including a first offset parameter applied to one of an in-sync and out-of-sync quality threshold, criterion for BFD relaxation fulfilled when downlink radio link quality on a configured BFD reference signal resource is better than a second threshold, the second threshold including a second offset parameter applied to the one of the in-sync and out-of-sync quality threshold, the first offset parameter being configurable separately from the second offset parameter;

in response to the mobility criterion and the serving cell criterion being satisfied, measure the RLM signals using relaxed measurement criteria;

compare a quality of the RLM signals with a predetermined RLM relaxation threshold; and based on a comparison between the quality of the RLM signals and the predetermined RLM relaxation threshold, no longer use the relaxed measurement criteria to measure the RLM signals.

18. The communication system of claim 17, wherein the processing circuitry is configured to determine whether to continue to use the relaxed measurement criteria based on at least one of whether out-of sync indications are to be sent or whether a T310 timer is running.

* * * * *